United States Patent [19]

Kunz et al.

[11] 4,268,006

[45] May 19, 1981

[54] MODULATING DIAPHRAGM VALVE

[75] Inventors: Bernard L. Kunz, Collinsville, Ill.; David P. Hargraves, Webster Groves, Mo.

[73] Assignee: Emerson Electric Co., St. Louis, Mo.

[21] Appl. No.: 72,552

[22] Filed: Sep. 4, 1979

Related U.S. Application Data

[63] Continuation-in-part of Ser. No. 911,883, Jun. 2, 1978, abandoned.

[51] Int. Cl.³ .............................................. F16K 31/04
[52] U.S. Cl. ...................................... 251/11; 60/529; 236/68 R; 251/30; 251/38
[58] Field of Search ................... 137/514; 251/30, 45, 251/120, 11, 38; 60/529; 236/101 B, 68 R

[56] References Cited

U.S. PATENT DOCUMENTS

| | | | |
|---|---|---|---|
| 2,251,441 | 8/1941 | Dillman | 251/30 |
| 2,844,352 | 7/1958 | Dahl | 251/45 |
| 3,155,366 | 11/1964 | Rasmussen | 251/45 |
| 3,189,277 | 6/1965 | Fox | 236/101 B |
| 3,208,716 | 9/1965 | Rolfe | 251/30 |
| 3,253,615 | 5/1966 | Armstrong | 251/30 |
| 3,362,679 | 1/1968 | LeWan | 251/30 |
| 3,363,433 | 1/1968 | Barbier | 251/30 |
| 3,576,292 | 4/1971 | Block | 251/30 |
| 3,717,301 | 2/1973 | McIntosh | 251/38 |
| 3,790,076 | 2/1974 | Wichtel | 236/101 B |
| 3,791,578 | 2/1974 | Brand et al. | 251/38 |
| 3,943,975 | 3/1976 | Schnittker | 251/30 |
| 3,967,781 | 7/1976 | Kunz | 60/529 |
| 3,985,296 | 10/1976 | Fujiwara | 236/101 B |
| 4,126,293 | 11/1978 | Zeuner et al. | 251/30 |

FOREIGN PATENT DOCUMENTS 876709 9/1961 United Kingdom ................. 251/45

Primary Examiner—Martin P. Schwadron
Assistant Examiner—G. L. Walton
Attorney, Agent, or Firm—Polster, Polster and Lucchesi

[57] ABSTRACT

A pilot controlled, diaphragm actuated valve having simplified construction is provided which is capable of maintaining a variety of valve operating positions. In the preferred embodiment, the valve pin is controlled precisely with respect to the pilot opening in the diaphragm to permit modulation of the diaphragm position. Control of the valve pin is maintained through the use of a power assembly which positions the valve pin in accordance with some sensed system variable. The valve includes structure for reducing instability of the valve over the valve operating range.

7 Claims, 6 Drawing Figures

MODULATING DIAPHRAGM VALVE

This is a Continuation-In-Part of Application Ser. No. 911,883, filed June 2, 1978, now abandoned.

BACKGROUND OF THE INVENTION

This invention relates to values for modulating fluid flow in refrigeration systems. While the invention is described in particular detail with respect to such systems, those skilled in the art will recognize the wider applicability of the valve disclosed hereinafter.

Diaphragm valves incorporating pilot valve actuation are well known in the art. In general, these values include a flexible diaphragm interposed between the valve input and the valve output sides. The diaphragm has a bleed opening in it, and higher pressure fluid from the valve input side is allowed to equalize the forces acting on first and second sides of the diaphragm. When the main valve is to be activated, a pilot valve is opened which quickly relieves pressure on the first side of the diaphragm, permitting the high pressure fluid on the second side of the diaphragm to lift the diaphragm, thereby opening the main fluid passageway through the valve.

It has been common to employ a solenoid to actuate the pilot portion of the valve in prior art diaphragm valve constructions. The solenoid generally is operatively connected to the pilot valve so that energization of the solenoid opens the pilot valve while de-energization of the solenoid closes the pilot valve. The pressure differential on opposite sides of the diaphragm caused by pressure relieved through the pilot valve is used to lift the diaphragm. While prior art diaphragm valves have functioned satisfactorily, in the past such valves have been characterized by single point operation. That is to say, the valves operate at one of two positions, fully on or off, and diaphragm valves have not been capable of modulating the flow through the main fluid passageway. In addition, in applications where the main inlet fluid pressure fluctuates over relatively wide range, solenoid operated valves have been known to operate unsatisfactorily. Thus, at high input pressures, the rating of solenoid may be insufficient to permit operation and failure of the solenoid results. While pilot operation of the diaphragm valve was intended to avoid solenoid burn out, at low input pressures, the differentials on each side of the diaphragm may be insufficient to open the diaphragm and flow through the valve becomes unpredictable.

A number of solutions have been proposed to overcome the problems associated with solenoid actuation of the diaphragm valve. For example, the United States Patent to Schnittker, U.S. Pat. No. 3,943,947, assigned to the assignee of the present invention, is specifically designed to overcome problems associated with diaphragm actuation at low input pressures.

While the prior art in general, and Schnittker in particular, works for its intended purpose, the diaphragm actuated valve disclosed hereinafter offers superior performance capability while eliminating many deficiencies encountered with prior art diaphragm actuated valves. Surprisingly, we have found that diaphragm valves can be utilized to modulate fluid flow through a valve by controlling flow through the pilot valve so that the forces acting on the diaphragm attain equilibrium relationship at a variety of diaphragm positions. This is accomplished by utilizing a heat motor axially arranged with respect to a valve stem mounted for movement in the pilot valve opening of the diaphragm. The valve stem is directly driven by the heat motor to precise relative position with respect to the pilot valve opening.

There are special considerations encountered in employing a modulating heat motor with a piloted diaphragm valve. We have found that the simple combination of heat motor and valve often results in unstable operation. That is to say, the diaphragm will oscillate rapidly rather than maintain an equilibrium position in response to pilot pin position. The unstability is particularly prevalent at high pressure differentials which often occur in refrigeration systems. We have found that heat motors can be successfully employed in modulating diaphragm valve if the valve incorporates structure for reducing the instability. Such structure, in the embodiment illustrated, includes a specially designed flow baffle positioned below the diaphragm, and a friction damper in the form of guide fingers which are movable with the valve stem.

One of the objects of this invention is to provide a diaphragm actuated valve capable of modulating fluid flow through the valve.

Another object of this invention is to provide a low cost modulating valve construction.

Another object of this invention is to provide a pilot controlled diaphragm actuated valve in which the pilot valve has a positive force acting to close it.

Another object of this invention is to provide a valve construction which permits valve actuation regardless of the pressure differential between the outlet and the inlet side of the valve.

Another object of this invention is to provide a modulating valve construction which provides improved stability over the operating range of the valve.

Other objects of this invention will be apparent to those skilled in the art in light of the following description and accompanying drawings.

SUMMARY OF THE INVENTION

In accordance with this invention, generally stated, a pilot controlled diaphragm actuated valve is constructed to permit the diaphragm to assume a variety of positions, thereby enabling the diaphragm to modulate valve operation. The valve includes a valve stem which is controlled precisely with respect to a pilot opening in the diaphragm. The relationship of valve pin and pilot opening controls the various forces acting on the diaphragm, and those forces are varied to attain the variation in diaphragm position and subsequent valve modulation characteristics. The valve structure further incorporates means for reducing diaphragm instability over the operating range of the valve.

DESCRIPTION OF THE PREFERRED EMBODIMENT

Figure 1:
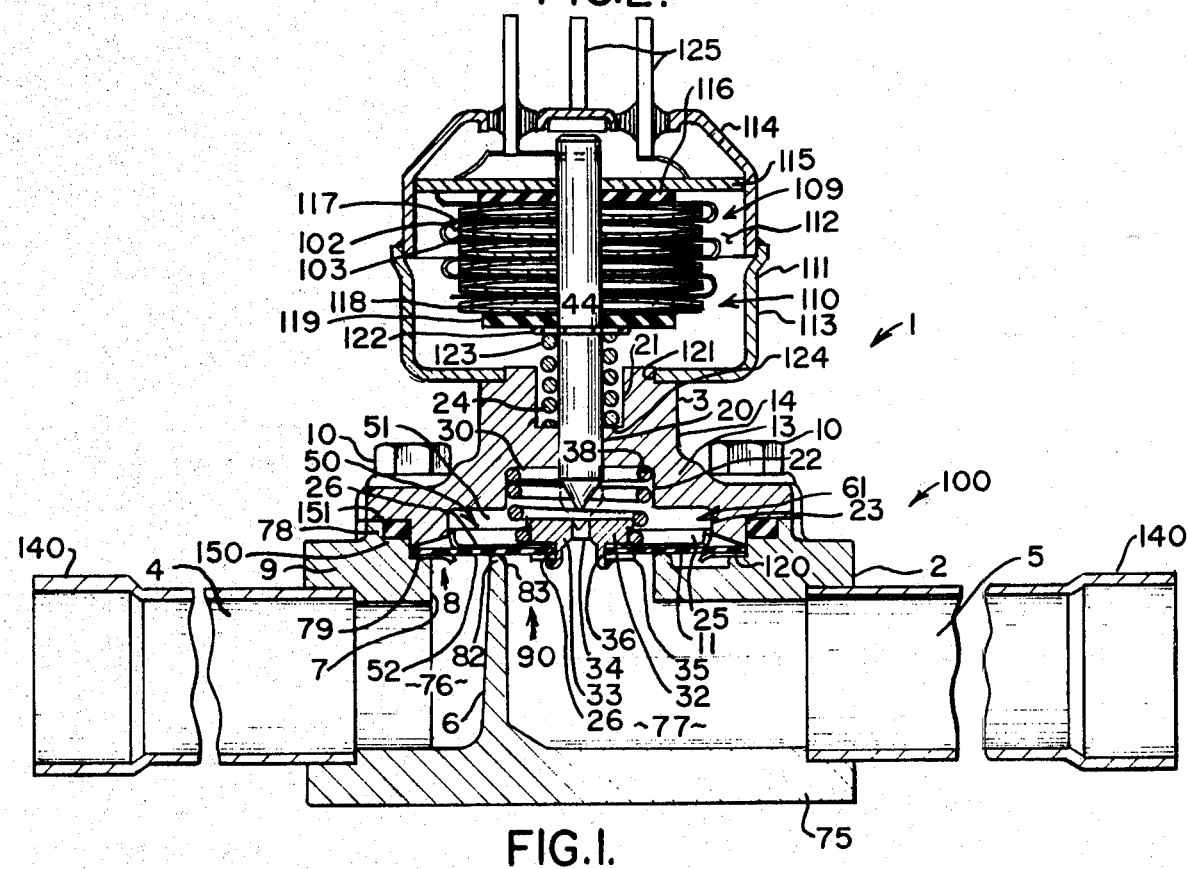
FIG. 1 is a cross-sectional view of one illustrative embodiment of diaphragm valve of this invention, the valve being shown in its closed position.

Referring now to FIG. 1, reference numeral 1 indicates one illustrative embodiment of valve of this invention. The valve 1 includes a valve casing 100 having a lower portion 2 and an upper portion 3.

Lower portion 2 generally is defined by a tubular section 75 having an inlet 4 and an outlet 5 separated by a partition 6. The partition 6 preferably is constructed integrally with the tubular section 75. However, the partition 6 may be manufactured separately and inserted within the section 75, if desired. Partition 6, in the embodiment illustrated, is annular in plan, having an upper end 82 defining a central opening 90. The inlet 4 and outlet 5 are utilized to intermount the valve in a particular application. As shown, tube stubs 140 are attached at the inlet and outlet sides of the tubular section 75 for that purpose. The tube stubs 140 are connected to the tubular section 75 by any convenient method. Welding or brazing work well, for example. Other interconnection techniques are compatible with the broader aspects of this invention.

Section 75 includes a side wall 7 delimiting an opening 8 which communicates with the opening 90 along the upper end 82 of the partition 6. Side wall 7 also defines an annular flange 9 about the opening 8. The partition 6 is positioned with respect to the opening 8 in the section 75 so that it delimits an inlet chamber 76, while the opening 90 and the partition 6 communicate with the outlet 5 and with it defines an outlet chamber 77. The flange 9 includes an upwardly projecting lip 78 and a relatively broad support area 79. The lip 78 has a rim 150 formed in it, which receives a conventional seal 151, the seal being locked between the lower part 2 and the upper part 3 of the valve 1.

The upper end 82 of the partition 6 defines a seat 83 for a valve assembly 61. Valve assembly 61, for the purposes of this specification, includes a flexible diaphragm 11, a pilot valve member 32, a spring 38, a valve pin 44 and a power assembly 110.

The upper portion 3 is attached to the lower portion 2 of the valve casing 100 along the flange 9 by any convenient means. Conventional threaded fasteners 10 are utilized in the embodiment illustrated. When so intermounted, the portions 2 and 3 delimit a diaphragm chamber 50. Prior to the attachment of the lower and upper portions 2 and 3, various components of the valve assembly 61 are positioned in the opening 8 so that the outer edge of the diaphragm 11 rests along the support area 79 and particularly along a support means 120. Support means 120 is an annular disk which functions to prevent distension of the diaphragm in the closed or off position of the valve 1. Interconnection of the parts 2 and 3 secures the diaphragm 11 in the valve 1. As indicated, the seal 151 is used to prevent fluid leakage along the flange 9, between the upper portion 3 and the lower portion 2 of the casing 100.

The upper portion 3 of the valve 1 includes a base area 13 and a centrally located hub 14 extending upwardly from the base 13. It is conventional to use the base 13 for inserting the fasteners 10 in the interconnection of the portions 2 and 3. The power assembly 110 is mounted to the valve 1 along the hub 14 of the upper portion 3 in any convenient manner. For example, a flange 121 may be provided to receive an end of an enclosure 111 of the power assembly 110. The enclosure 111 may be mounted to the flange 121 by welding or brazing, for example.

The upper portion 3 of the valve 1 has a central opening 20 extending through it. The opening 20 is designed with a predetermined number of axially aligned but diametrically varying diametric sections 21, 22 and 23. The diaphragm 11 divides the chamber 50 into a first chamber part 51 on the section 23 side of the diaphragm, and a chamber part 52 on the inlet 4 side of the diaphragm. The section 22 provides a receptacle for a spring 38 which is biased between a wall 30 of the section 22 and a plate 25 of the diaphragm 11.

Diaphragm 11 has a central opening 26 in it. The opening 26 is sized to receive the pilot valve member 32. The pilot valve member 32 includes an upper portion 33 having a pilot opening 34 in it, and a bottom plate 35 which is attached to an annular hub 36 of the member 32 by any convenient method. For example, the hub 36 may be coined over to sandwich the diaphragm 11, the plate 35 and the upper part 33 of the valve member 32 to one another in a conventional manner. Diaphragm 11 has a bleed opening 26 formed in it, which permits fluid communication between the chamber part 52 and the chamber part 51. As indicated above, the chamber parts 51 and 52 are positioned on opposite sides of the diaphragm 11. Consequently, the chamber part 51 will be at the same pressure as the inlet chamber 76 and chamber part 52 in the closed or off position of the valve 1, the closed position being shown in FIG. 1. Valve pin 44 is movably mounted in the upper part 3 between a first position, closing the pilot opening 34 in the pilot valve member 32 and a plurality of second positions remote therefrom. The spring 38 exerts a positive force on the diaphragm 11, urging the diaphragm 11 toward its closed position in abutment with the end 82 of the partition 6.

The power assembly 110, in the embodiment illustrated, comprises a heat motor 109 mounted in a compartment 112 defined by the enclosure 111.

Enclosure 111 includes a bottom 113 and a top 114 joined to one another to delimit the compartment 112. A support means 115 extends across the width dimension of the enclosure 111, along the top 114. The support means 115 permits passage of the valve pin 44 during operation of the valve 1. An insulator 116 is positioned adjacent the support means 115. Heat motor 109 includes a heating means 117 interleaved between a plurality of disc pairs 118. Heating means 117 conventionally is a resistive heating element carried by an insulative member, the heating element being arranged to receive the disc pairs in a conventional manner. "Interleaved" as used herein, is intended to encompass a variety of heating element/disc arrangements, and is not limited to the alternate heating element/disc arrangement illustrated in the drawings. The disc pairs 118 are formed from a first disc 102 and a second disc 103 touching along their perimeters. The discs 102 and 103 are each constructed from two dissimilar materials having differing coefficients of expansion; the two materials being bonded together in sandwich fashion to form the disc. When heated, the different coefficients of expansion of the material causes each disc to deform; one side becoming concave and the other side convex. Consequently, the disc pairs expand as a result of deformation acting to bow the disc pairs as illustratively shown in FIG. 1. A second insulator 119 is positioned adjacent a stop 122. Stop 122, in turn, is attached to the valve pin 44 in a conventional manner. For example, the stop 122 may be frictionally engaged in a slot of the valve pin 44. A spring 123 is biased between the stop 122 and a bottom wall 124 of the section 21 of the upper portion 3.

The heating means 117 is connected to a source of electrical energy through electrical connectors 125. As will be appreciated by those skilled in the art, application of electrical energy to the heating means 117 may be made dependent upon some sensed condition or conditions of the system with which the valve 1 finds application. Also, a temperature sensor may be incorporated in the disc stack to provide a feedback control to the heater such that the disc stack temperature is maintained regardless of ambient or fluid temperature. This feature is described in Kunz Patent, U.S. Pat. No. 3,967,781. In the preferred embodiment, the feedback sensor is a P-N junction diode. When the diode temperature changes the constant current response voltage also changes as a linear function. This signal may be transduced by an electronic circuit, controlling heater power input such that a prescribed disc temperature is held.

Operation of the device 1 is relatively simple to understand. Fluid at the inlet 4 passes through the bleed opening 26 to the section 23 or the chamber part 51 side of the diaphragm 11 where it acts upon the diaphragm, in conjunction with the spring 22, to force the diaphragm 11 against the partition 6, closing the main valve flow passageway. In the closed position, the valve pin 1 is positioned to block the pilot opening 34, that valve pin 44 position being shown in dotted lines in FIG. 1. When activation of the valve is desired, the heating means is allowed to cool so that the pin 44 may retract, opening the pilot opening 34. The outrush of high pressure from the section 23 or chamber part 51 side of the diaphragm 11 through the opening 34 to the low pressure outlet side of the valve 1 permits the pressure of the fluid on the inlet 4 side of the valve to overcome the spring force exerted by the spring 38, opening the diaphragm in a conventional manner.

The valve of this invention differs from prior art diaphragm valves in that thereafter, the diaphragm position may be modulated by action of the valve pin 4. That is to say, operation of the power assembly 110 can be controlled so that the valve pin 44 may assume a variety of positions with respect to the opening 34 in the pilot valve member 32. As the valve pin 44 moves downwardly from the fully opened position shown in solid lines in FIG. 1, will tend to block the pilot opening 34. As opening 34 becomes restricted, fluid from the inlet 4 will bleed through the opening 26 to the section 23 of the diaphragm tending to close the diaphragm. If valve pin location is maintained at a particular point, the diaphragm then will begin to close until it moves away from the pin 44, and again the pressure from the section 23 or chamber 51 side of the diaphragm will be drawn to the outlet side 5 through the pilot opening 34. The diaphragm 11 will react in this manner until the diaphragm comes to equilibrium position with respect to the valve pin. That position will be one other than fully open and closed. Of course, additional movement of the valve pin will establish a new equilibrium position for the diaphragm, and any number of positions between fully opened and closed can be obtained. This is in contradistinction to prior art diaphragm valves which operate any at fully opened or closed positions.

Figure 2:
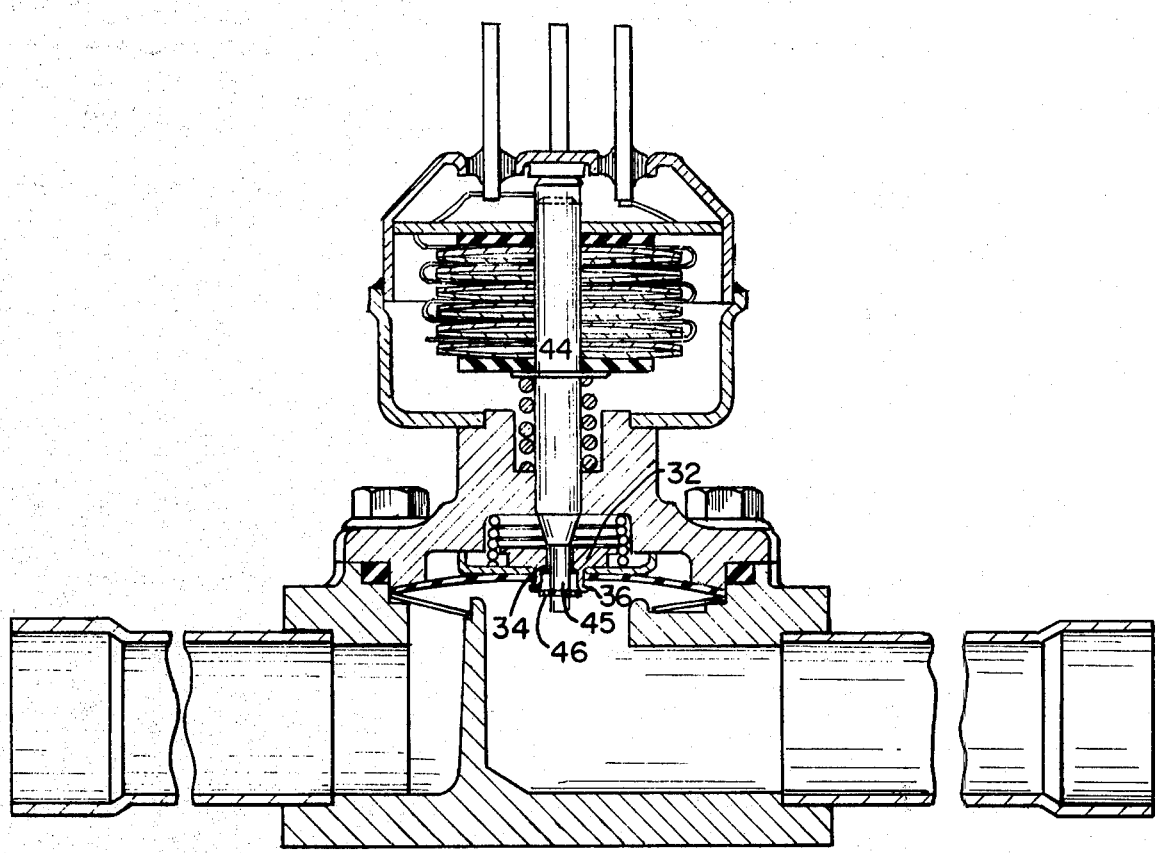
FIG. 2 is a cross-sectional view of a second illustrative embodiment of diaphragm operated valve of this invention, the valve being shown in its open position.

FIG. 2 illustrates a valve construction which ensures diaphragm activation, even at low or zero pressure differentials between the inlet 4 and outlet 5 in system application of the valve 1. In FIG. 2, like numerals are utilized for like parts where appropriate. As there shown, the valve stem 44 has an extension 45 projecting through the pilot opening 34 to the outlet side of the diaphragm 11. The extension 45 has a retaining ring 46 attached to it, which is sized to engage the hub 36 of the valve member 32 during activation of the valve 1, should the inlet pressure be insufficient to open the diaphragm. That is to say, the retaining ring 46 ensures that contraction of the heat motor 109 will open the diaphragm 11 even where pressure differential between the inlet 4 and outlet 5 is so small as to be nonexistent for practical purposes. In other respects, valve operation is the same as described previously.

Figure 3:
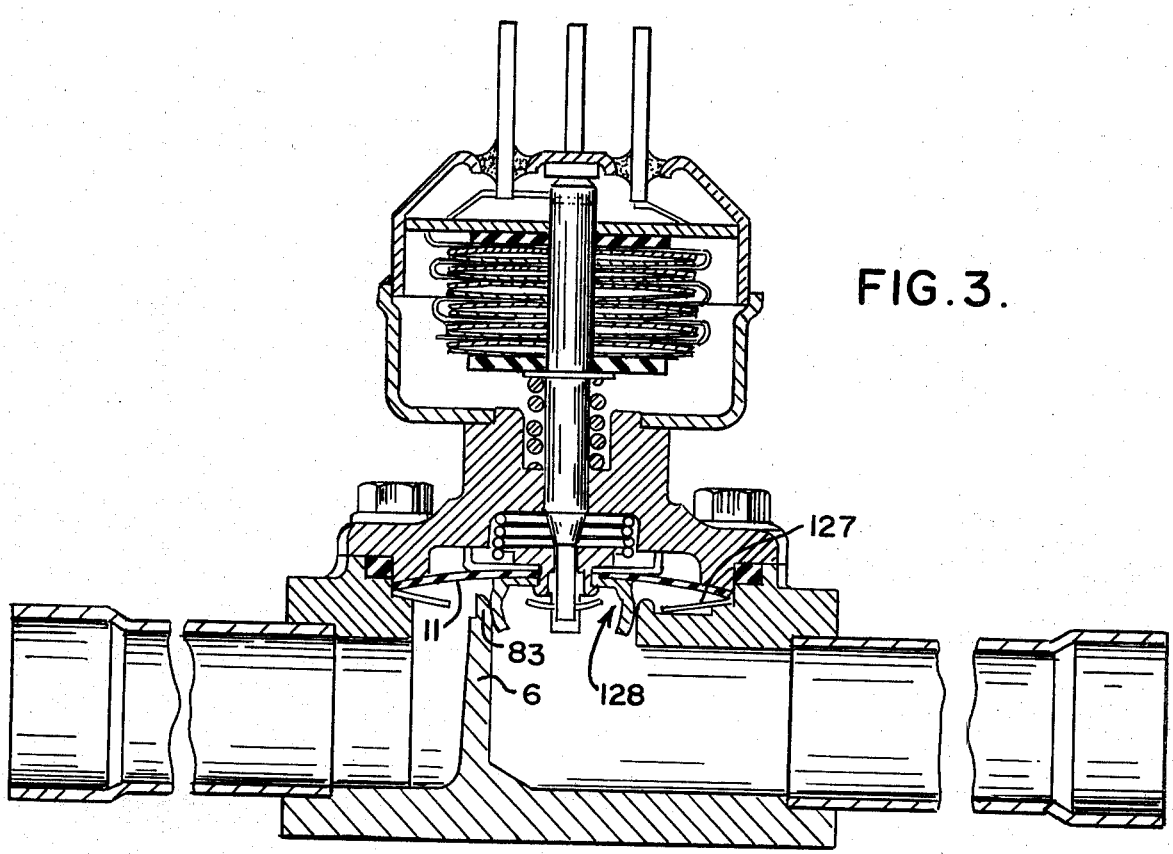
FIG. 3 is a cross-sectional view of a third illustrative embodiment of diaphragm operated valve of this invention, the valve being shown in its open position.
Figure 4:
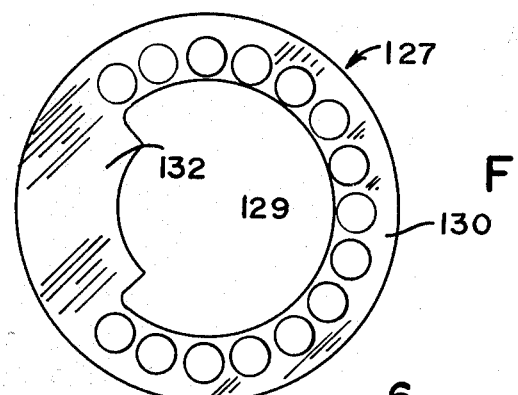
FIG. 4 is a top plan view of a baffle plate employed in conjunction with the valve embodiment of FIG. 3.
Figure 5:
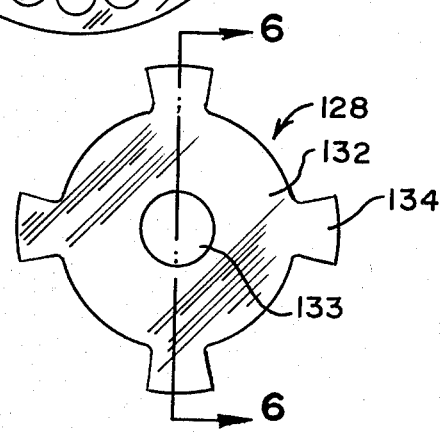
FIG. 5 is a top plan view of a friction damper employed in conjunction with the valve embodiment of FIG. 3.
Figure 6:
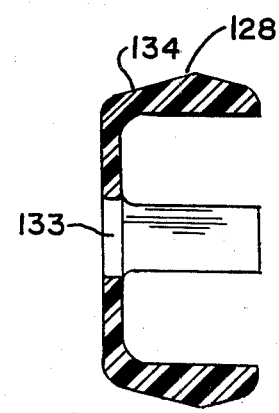
FIG. 6 is a sectional view taken along the line 6—6 of FIG. 5.

While the valve constructions just described work for their intended purposes, we have found that certain applications require special valve structure to prevent instability of valve operation. Like numerals are utilized for like parts, were appropriate. In general, the valve construction of FIG. 3 is similar to that shown in FIGS. 1 and 2. FIG. 3 differs from those embodiments because of the use of a specially designed baffle plate 127 and friction damper means 128.

The baffle plate 127 is an annular structure having a central opening 129 formed in it so as to define a rim 130. The rim 130 has a plurality of flow parts 131 formed in it. Prior art baffle plates were symmetrical in construction. The plate 127, however, has a solid section 132 which abuts the diaphragm 11 in the closed position of the valve along the outlet side of the valve. The section 132 prevents high pressure fluid on the inlet side of the valve from lifting the diaphragm edge. Diaphragm edge lifting has been a problem in some applications of the valve of this invention.

Friction damper means 128 include a generally annular body part 132 having an opening 133 formed in it. The opening 133 receives the valve pin 44 in a conventional manner to enable the damper means 128 to be mounted for movement with the valve pin 44. A plurality of fingers 134 extend outwardly of the body part 132, the fingers, in the embodiment illustrated, being generally perpendicular to the body part. The damper means 128 is sized so that the fingers 134 engage the valve 1 structure along the partition 6 portion thereof, and in particular, along the seat 83 of the valve. The damper means 128 prevents unwanted oscillation of the diaphragm 11 during valve operation.

Numerous variations, within the scope of the appended claims, will be apparent to those skilled in the art in light of the foregoing disclosure and accompanying drawings. For example, the design of the pilot valve member 32 may be varied. Likewise, the shape of the upper and lower portions 2 and 3 may assume a variety of configurations. The design of heat motor 109 or enclosure 111 may be altered. While the extension 45 was described as including a retaining ring, for operation, any construction enlarging the free end of extension 45 may be employed. Other design silhouettes may be employed for the baffle plate 127 and damper means 128, if desired. Other modifications will occur to those skilled in the art. These variations are merely illustrative.

Having thus described the invention, what is claimed and desired to be secured by Letters Patent is:

1. A modulating diaphragm actuated valve, comprising:
   a valve body having an inlet, an outlet, a main flow port between said inlet and said outlet, and a chamber part above said main flow port on the inlet side of said main flow port;
   a diaphragm mounted for movement in said chamber between a first position closing said main flow port and a plurality of open positions with respect to said main flow port, said diaphragm having an opening in it to permit fluid flow between said inlet and said chamber part;
   a baffle plate in supporting relationship to said diaphragm, said baffle having a fluid pervious portion along the input side of said valve and a fluid impervious portion along the outlet side of said valve, said fluid impervious portion acting to prevent inlet fluid pressure from affecting operation of said diaphragm;
   pilot valve means mounted to said diaphragm and movable therewith, said pilot valve means having a pilot opening therethrough, said pilot opening communicating with said chamber part and said outlet;
   a valve pin mounted in said pilot opening, said valve pin having a part closing said pilot opening;
   means for varying the position of said valve pin with respect to said pilot valve means, said last-mentioned means including a heat motor having a plurality of selective axial positions, said heat motor being axially aligned with said valve pin and operatively connected thereto for controlling the position of said valve pin directly in a plurality of positions of said valve pin;
   a first spring mounted in said chamber and adapted to exert a force on said diaphragm so as to urge said diaphragm toward its closed position;
   second spring means operatively connected to said actuator means and adapted to bias said valve pin toward its open position in at least one position of said diaphragm; and
   damper means mounted for movement with said valve pin for damping oscillation of said diaphragm.

2. The valve of claim 1 wherein said damper means comprises a body section having a plurality of finger-like projections extending from said body section.

3. The valve of claim 2 wherein said valve pin extends through the pilot opening in said pilot valve means, said valve pin having an enlargement along one end thereof for engaging said pilot valve means in at least one operating position of said valve pin.

4. In a diaphragm actuated valve, said valve having a valve body including an inlet, an outlet, a main flow port between said inlet and said outlet, a chamber along said flow path on the inlet side of said flow path, a diaphragm mounted for movement in said chamber, a pilot valve means mounted to said diaphragm and movable therewith, said pilot valve means having a pilot opening in it communicating with said chamber and said outlet, and a valve pin at least partially mounted in said valve opening, the improvement comprising means for selectively varying the position of said valve pin with respect to said pilot valve means to permit controlled modulation of said diaphragm, said position varying means including power means attached to said valve pin, said power means being operable to selectively control the position of said valve pin with respect to said pilot valve opening to provide a plurality of operating positions for said valve, friction damper means mounted for movement with said valve pin, and a baffle plate in supporting relationship to said diaphragm, said baffle having a part pervious to fluid flow along the input side of said valve and a fluid impervious portion along the outlet side of said valve, said last-mentioned impervious portion acting to prevent inlet fluid pressure from inadvertently affecting diaphragm operation.

5. The improvement of claim 4 wherein said power means is axially aligned with said valve pin.

6. The improvement of claim 5 wherein said valve pin extends through said pilot opening, said valve pin having an enlargement along one end thereof for engaging said pilot valve means in at least one operating position of said power means.

7. The improvement of claim 6 further including first spring means mounted in said chamber and adapted to exert a force on said diaphragm to urge said diaphragm toward its closed position, and second spring means operatively connected to said power means and adapted to bias said valve pin toward its open position in at least one position of said diaphragm.

* * * * *

UNITED STATES PATENT AND TRADEMARK OFFICE
CERTIFICATE OF CORRECTION

PATENT NO. : 4,268,006
DATED : May 19, 1981
INVENTOR(S) : Bernard L. Kunz et al

It is certified that error appears in the above—identified patent and that said Letters Patent is hereby corrected as shown below:

Column 1, line 13, "incorporting" should be "incorporating".
Column 1, line 41, "range" should be "ranges".
Column 5, line 47, "valve pin 4" should be "valve pin 44".
Column 5, line 56, "23 of" should be "23 side of".

Signed and Sealed this

Eighteenth Day of May 1982

[SEAL]

Attest:

GERALD J. MOSSINGHOFF

Attesting Officer

Commissioner of Patents and Trademarks